S. T. ALLEN.
AUTO TOP.
APPLICATION FILED DEC. 14, 1916.
1,305,185.
Patented May 27, 1919.
2 SHEETS—SHEET 1.
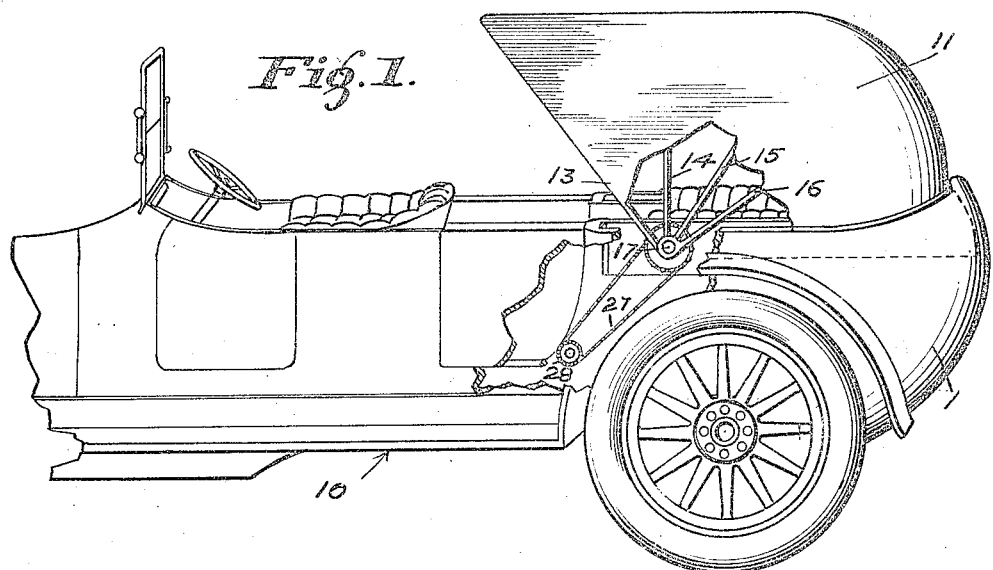
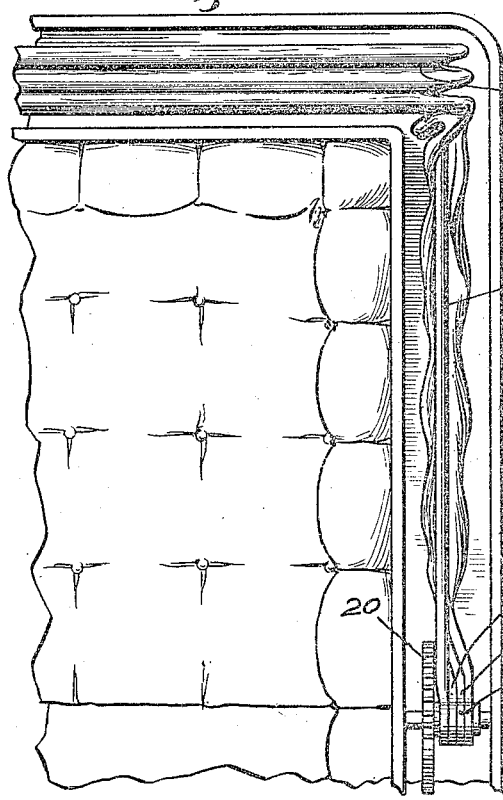
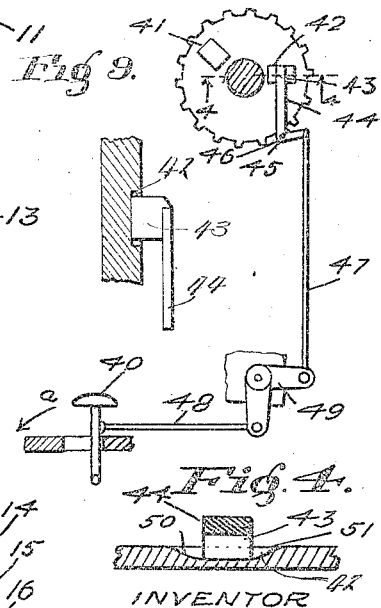
INVENTOR
Sherman T. Allen
by Hazard & Miller
ATTYS S. T. ALLEN.
AUTO TOP.
APPLICATION FILED DEC. 14, 1916.
1,305,185.
Patented May 27, 1919.
2 SHEETS—SHEET 2.
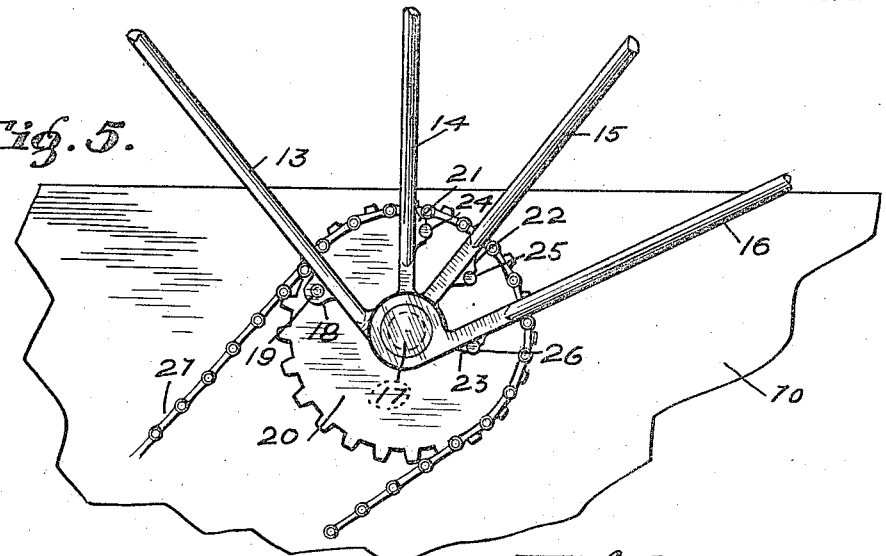
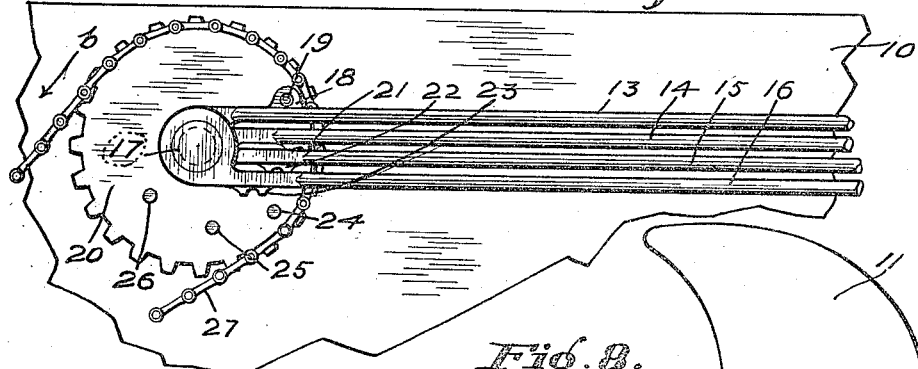
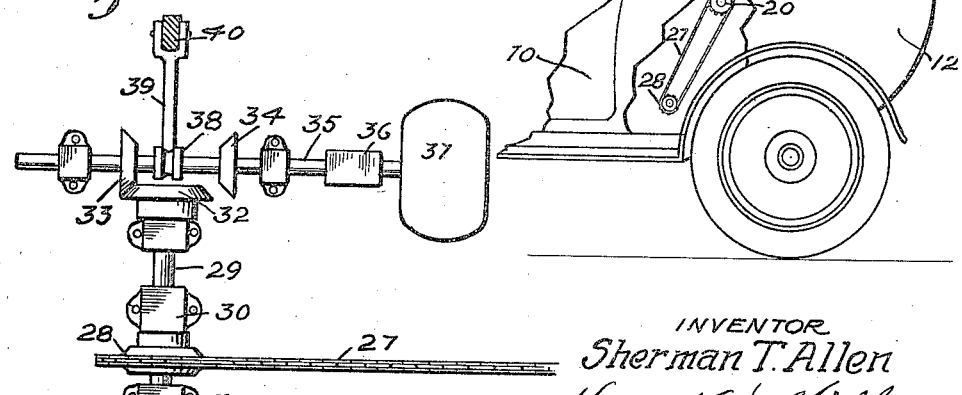
INVENTOR
Sherman T. Allen
by Hazard & Miller
ATTYS.

UNITED STATES PATENT OFFICE.

SHERMAN T. ALLEN, OF LOS ANGELES, CALIFORNIA.

AUTO-TOP.

1,305,185.

Specification of Letters Patent. Patented May 27, 1919.

Application filed December 14, 1916. Serial No. 136,948.

*To all whom it may concern:*

Be it known that I, SHERMAN T. ALLEN, a citizen of the United States, residing at Los Angeles, in the county of Los Angeles and State of California, have invented new and useful Improvements in Auto-Tops, of which the following is a specification.

This invention relates to a vehicle top and particularly pertains to mechanical means for raising and lowering the same.

It is the object of this invention to provide a vehicle top which is adapted to be raised and lowered by a mechanism positively driven and readily controlled by the operator.

Another object of this invention is to provide an operating mechanism for positively raising and lowering a vehicle top and which is so constructed as to prevent damage to the top, in case the mechanism is not rendered inoperative at the conclusion of the raising or lowering operation.

Another object of this invention is to provide a mechanism for raising and lowering a vehicle top which may be readily inclosed within the construction of an automobile and which will not require material change in the detailed formation of the top.

It is a further object of this invention to provide an automobile top and positively operating mechanism therefor which is simple in its operation and may be readily controlled by the operator.

Other objects will appear hereinafter.
The invention is illustrated, by way of example, in the accompanying drawings in which:

Figure 1 is a view illustrating the body portion of an automobile which is fitted with a victoria top adapted to be raised and lowered by the operating mechanism with which the present invention is concerned.

Fig. 2 is a fragmentary view of the top as down and further illustrates pivotally mounted bows upon the body of the vehicle.

Fig. 3 is a view illustrating the locking mechanism provided the top and further discloses the manner in which it is automatically actuated when the power is applied to operating mechanism.

Fig. 4 is an enlarged view in section on the line 4—4 of Fig. 3, illustrating the manner in which the locking dog engages the driven sprocket of the actuating mechanism.
Fig. 5 is an enlarged fragmentary view of the pivotal mounting provided the top bows and further discloses them in an open position.

Fig. 6 is a view similar to the preceding view and illustrates the top as closed.

Fig. 7 is a view in plan illustrating the control mechanism by which power is transmitted to the top operating mechanism.

Fig. 8 is a fragmentary view of another form of top as seen in its raised position.

Fig. 9 is an enlarged view in section taken longitudinally of the locking pawl and particularly discloses the manner in which it engages the driving sprocket.

Referring more particularly to the drawings, 10 indicates the body of an automobile which is here shown as fitted with top 11 of which is here shown. The body is formed with the victoria type. The body is formed with a rear extension 12 adapted to provide a compartment within which the closed top may be folded. However, this construction might be dispensed with if desired. The top here shown has four bows 13, 14, 15 and 16, which are mounted upon a common pivot shaft 17 held within suitable bearings fixed within the body construction of the automobile. The bow 13 is fitted with a lug 18 through which a bolt 19 passes and secures it to driven sprocket 20, also mounted upon the shaft 17. The bows 14, 15 and 16 are formed with engaging lugs 21, 22 and 23, respectively, which are mounted upon the right-hand side of each bow and are adapted to be engaged by pins 24, 25 and 26, which extend outwardly from the face of the sprocket 20 and are graduated in length so that they may engage their intended bow lug. The pin 24 is the shortest of the three and will pass by the bows 15 and 16, after which the pins 25 and 26 will successively engage the lugs on these bows.

The sprocket 20 is adapted to be driven and the top raised and lowered by means of a sprocket chain 27 which is led around a sprocket wheel 28, preferably mounted beneath the floor of the vehicle body. This sprocket is mounted upon a jack shaft 29 which is secured within bearings 30 and 31. The opposite end of the shaft 29 is fitted with a friction cone 32 adapted to be alternately engaged by driving cones 33 and 34 which are mounted upon a reciprocating drive shaft 35. This shaft is connected by means of a sliding coupling 36 with a suitable source of power, here indicated as an electric motor 37. The cones 33 and 34 are spaced a distance from each other so that but one of them will be in frictional engagement with the friction cone 32 at a time. Secured upon the shaft between these cones is a grooved collar 38 adapted to be engaged by the yoke of a shifting lever 39, which may be oscillated to alternately throw the cones 33 and 34 into engagement with the cone 32. The lever is bifurcated at its outer end to slidably engage a foot pedal 40, by which the mechanism is controlled.

As a means for automatically locking the driven sprocket 20 when the top is in either its raised or lowered position, a pair of locking grooves 41 and 42 are formed at suitable intervals upon the back of the sprocket and are adapted to be brought to register with a locking pawl 43, which is mounted upon a spring shank 44 secured to one leg of a bell crank 45. The spring shank 44 is formed from a flat spring which yieldably holds the locking pawl against the side face of the sprocket and forces it into the locking grooves as they are brought to register therewith. This crank is mounted upon a pivot pin 46 and is actuated by foot pedal 40 by means of pull rods 47 and 48 and a bell crank 49. The locking grooves are formed radially in relation to the shaft 17 and have oppositely disposed inclined side walls 50 and 51 adapted to permit the pawl 43 to ride up and out of the groove when actuated by the foot pedal. As particularly shown in Fig. 9, the sides of the grooves which extend substantially radially are square and act in combination with the pawl 43 to prevent rotation of the sprocket. Due to the inclined side walls of the grooves and the spring shank 44, the pawl 43 will be yieldably held in position and as it is swung will raise from the grooves and bear upon the smooth surface of the sprocket. In this manner the sprocket may freely move until the pawl is swung back into the path of travel of one of the grooves and will register therewith as the sprocket turns.

In operation it will be assumed that the top is in its closed and lowered position as indicated in Fig. 6 of the drawings. To raise this top the foot pedal 40 is forced forwardly in the direction of the arrow —a— indicated in Fig. 3. This will act through the shifting lever 39 to swing friction cone 34 into engagement with cone 32, thus causing the sprocket chain 27 to advance in the direction of arrow —b— in Fig. 6. The movement of the foot pedal, as described, will simultaneously act through the rods 47 and 48 and cause the bell cranks 45 and 49 to swing the pawl 43 out of groove 41, thus permitting the sprocket 20 to rotate. As this sprocket rotates in the direction of the arrow —b— it will advance the pin 19 and by means of the lug 18 draw the top bow 13 upwardly and swing it around the shaft 17. After the cover of the automobile has been drawn taut by the bows 13 and 14, the pin 24 will engage lug 21 on bow 14 and proceed to raise it. The actuation of bows 15 and 16 will be identical to that of bow 14 and in this manner each top bow will be positively raised. When the foot pedal 40 is swung in a rearward direction the cone 34 will be thrown out of engagement with the cone 32 and will incidentally throw pawl 43 into the groove 42, thus locking it against movement.

When it is desired to lower the top, the foot pedal 40 is swung rearwardly until the cone 33 engages the friction cone 32 to rotate the sprocket in reverse direction and simultaneously releasing the pawl 43 from the groove 42, after which the top bows will be successively lowered to a folded position.

It will at once be seen that this mechanism will act in a proper manner to gradually raise the top of the vehicle without damaging the top cover and that the mechanism may be easily controlled and readily rendered inoperative as desired.

I claim:

A vehicle top, comprising a series of top bows pivotally mounted upon common centers at the opposite sides of the vehicle body and at the termination of each bow member, a flexible canopy secured upon said bows, actuating disks pivotally mounted upon the centers of the bows, pins extending outwardly from said disks and adapted to individually and successively engage one of the bows to swing it upon its center, power driven means for rotating said disks, locking grooves formed upon the faces of the disks, and pawl members whereby the disks and bows may be locked in a raised or lowered position.

In testimony whereof I have signed my name to this specification.

SHERMAN T. ALLEN.

Copies of this patent may be obtained for five cents each, by addressing the "Commissioner of Patents, Washington, D. C."